July 12, 1966  A. N. ORMOND  3,260,938
TRANSDUCER NULL BALANCE POTENTIOMETER CIRCUIT HAVING SINGLE
ENERGIZING SOURCE AND DUAL SWITCH MEANS FOR ALTERNATELY
CONNECTING TRANSDUCER AND BRIDGE OUTPUTS TO SERVO-MOTOR
Filed Nov. 9, 1961

INVENTOR.
ALFRED N. ORMOND
BY *Elliott & Pastoriza*
ATTORNEYS.

United States Patent Office 3,260,938
Patented July 12, 1966

3,260,938
TRANSDUCER NULL BALANCE POTENTIOMETER CIRCUIT HAVING SINGLE ENERGIZING SOURCE AND DUAL SWITCH MEANS FOR ALTERNATELY CONNECTING TRANSDUCER AND BRIDGE OUTPUTS TO SERVO-MOTOR
Alfred N. Ormond, 11969 Riviera Road,
Santa Fe Springs, Calif.
Filed Nov. 9, 1961, Ser. No. 151,384
5 Claims. (Cl. 324—99)

This invention relates generally to electrical measuring circuits and more particularly to an improved potentiometer circuit for providing accurate indications of the value of output signals from a transducer.

The conventional type of potentiometer circuit over which the present invention constitutes an improvement operates on the principle of balancing the output signal to be measured against a known signal generated in a potentiometer bridge. Thus the bridge itself includes a variable resistance which is operated by a servo-amplifier and motor system responsive to an error signal constituting a function of the difference between the signal to be measured from the transducer and the known signal generated in the bridge. When the error signal is nulled so that the unknown and known signals are balanced, the setting of the variable resistance in the potentiometer bridge circuit constitutes an indication of the value of the unknown signal. This type of potentiometer circuit is referred to as a millivolt circuit since the output of the transducer may be read in terms of millivolts on the potentiometer.

In potentiometer circuits of the foregoing design, independent power supplies are provided for the transducer and the potentiometer circuit itself. While these power supplies may be designed to have a fixed ratio output of either voltage or current depending upon the impedance of the power supply so that proper calibration is possible to provide a desired output reading for a given input signal during subsequent use, any subsequent variation in these quantities supplied to the transducer and the potentiometer bridge circuit will result in an error. Thus, even though the voltages or currents for energizing the transducer and potentiometer circuit may be identical or of a known fixed ratio at the time the circuit is calibrated, subsequent changes in these quantities or in their ratio cannot be taken into account.

Another problem with these potentiometers results from the use of a converter means to chop the error signal in such a manner as to provide an A.-C. component to operate the servo-amplifier and motor system in order that the nulling of the signal may be carried out. Such a converter has heretofore been connected in series with one of the output signal leads from the transducer, the converter itself simply switching the input signal to the servo-amplifier between oposite terminals on the primary of the input transformer to the amplifier. As a consequence of this series type of connection, thermal E.M.F.'s, stray pick-up, and other noises present on the signal conductors and in the converter switch are amplified in the servo system along with the error signal to be nulled. As a consequence, accurate nulling cannot be achieved with the consequent result of errors in the output reading.

With all of the foregoing in mind, it is a primary object of this invention to provide an improved potentiometer circuit in which the foregoing problems are overcome.

More particularly, it is an object to provide a potentiometer circuit of the millivolt reading type so designed that the transducer and potentiometer circuit will be energized by either substantially identical voltages or currents to the end that variations in the particular voltages or currents or the ratios thereof supplied to the transducer and potentiometer circuit are avoided, thereby increasing the accuracy of the measuring instrument.

Another important object is to provide an improved potentiometer circuit designed in such a manner that spurious signals resulting from thermal E.M.F.'s, switch noises, and the like will be cancelled to the end that greater accuracy is achieved.

Briefly, these and many other objects and advantages of this invention are achieved by providing a single power supply source for energizing the transducer and potentiometer circuit. By employing a single source, identical voltages or currents depending upon the impedance of the power supply are provided so that there is no possibility of any variation in the ratio of the individual voltages or currents energizing the transducer and potentiometer circuits. In addition, the circuit includes dual switch means for effecting the function of the converter heretofore employed in such circuits. The dual switch means are arranged to connect alternately to first and second pairs of signal conductors connected to the transducer and potentiometer circuit, respectively, in such a manner as to chop the error or difference signal to be nulled and thereby provide an A.-C. component for operating the servo-amplifier and motor system. The dual switches are essentially in a parallel arrangement so that spurious voltage signals are cancelled.

A better understanding of the invention will be had by now referring to preferred embodiments thereof as illustrated in the accompanying drawings, in which.

Figure 1:
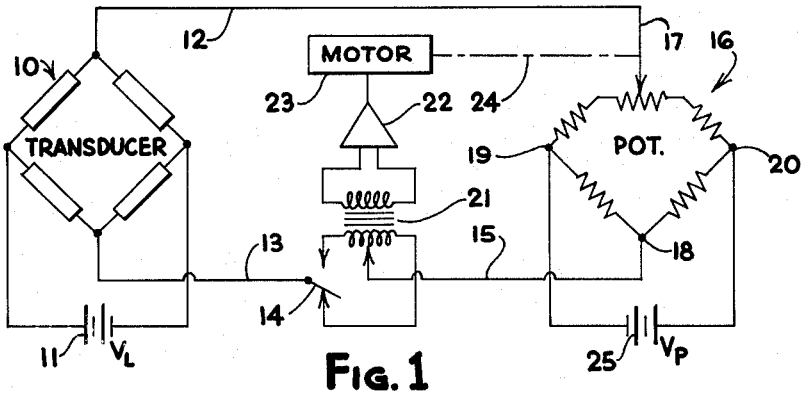
FIGURE 1 is a schematic diagram of a conventional type of millivolt reading potentiometer circuit.

Referring first to FIGURE 1, there is illustrated a transducer 10 which may take the form of a load cell. As shown, the transducer is energized by a first power supply 11 and the output signal or unknown signal to be measured is provided on output leads 12 and 13.

The output leads 12 and 13 constitute signal leads carrying the unknown signal to be measured to the potentiometer circuit. As shown, there is connected in series with the output lead 13 a converting circuit including a chopping switch 14 for alternately connecting the output signal between opposite terminals of the primary of an input transformer center tapped through lead 15. The lead 15 connects to a potentiometer bridge 16. The other output conductor 12 passes directly to a tap 17 on a variable resistance in the potentiometer bridge 16. The diagonally opposite junction 18 of the bridge 16 connects to the lead 15 as shown. The other two diagonally opposite terminals of the bridge are shown at 19 and 20.

The variable tap 17 for the variable resistance in the potentiometer bridge 16 is arranged to be moved by a servo-amplifier and motor system including an input transformer 21 for receiving an error signal which is a function of the difference of the unknown or output signal from the load cell 10 and the signal from the junction point 18 of the potentiometer bridge 16. The transformer 21 feeds into a servo-amplifier 22 to operate a motor 23 mechanically connected as indicated by the dash-dot line 24 to move the tap 17. The arrangement is such that the tap 17 will move in a direction to decrease the error signal until the same is nulled.

The junction points 19 and 20 connect to a separate source of voltage indicated by the battery 25 to energize the bridge.

In the conventional circuit shown in FIGURE 1, any variation in the voltages supplied to the transducer and potentiometer bridge from the separate sources 11 and 25 will result in an erroneous error signal which, upon nulling, will provide an erroneous reading. While the actual power supplies may provide different voltages, and proper readings may be obtained by calibrating the same, assuming a fixed ratio to exist between these voltages, errors may still be introduced if the fixed ratio should vary upon subsequent use of the instrument after calibration.

In addition, the converter chopping switch 14 is connected in series with the signal lead 13 and the signal lead 15. As a consequence, undesired spurious signals are introduced to the amplifier motor system. These spurious signals may result from thermal E.M.F.'s, noise in the switch 14, stray pick-up and the like.

Figure 2:
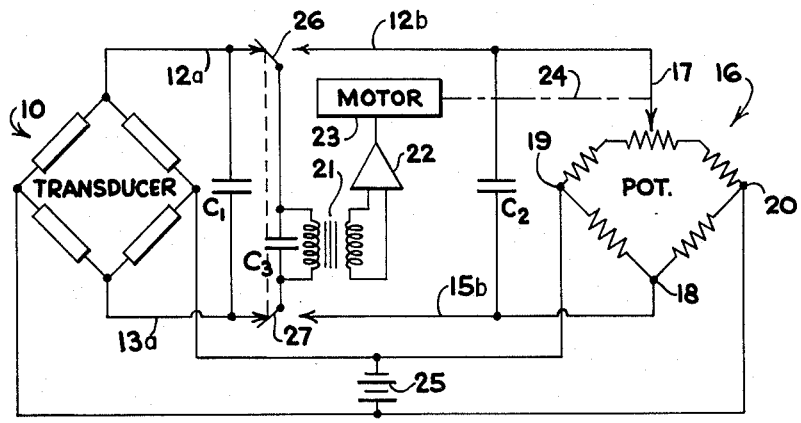
FIGURE 2 illustrates a first embodiment of the improved potentiometer circuit of this invention employing a low impedance power supply; and, FIGURE 3 illustrates a second embodiment of the improved potentiometer circuit of this invention employing a high impedance power supply.

Referring now to FIGURE 2, there is shown a first embodiment of the improved potentiometer of this invention in which the foregoing problems are overcome. In accordance with the embodiment illustrated in FIGURE 2, the power supply in the form of the battery 25 is connected in parallel to the transducer and the potentiometer bridge. With this arrangement, identical voltages are applied to both the transducer and potentiometer to energize the same. In addition, the converting circuit is altered by providing dual switch means in the form of switch arms 26 and 27 arranged to alternately connect between a first pair of conductors in the circuit which, in FIGURE 2, comprises the signal output conductors 12a and 13a from the transducer and a second pair of conductors which, in the embodiment of FIGURE 2, comprises the signal output conductors 12b and 15b from opposite sides of the potentiometer bridge 16. The particular error signal detected by the switches 26 and 27 and composed of the difference between the signals alternately supplied thereto from the transducer and potentiometer, respectively, is passed through the transformer 21 to the servo-amplifier 22 and motor 23 to vary the tap 17 and null the error signal to provide the desired output reading in the same manner as in FIGURE 1.

In FIGURE 2, however, it will be evident that the use of the single power supply 25 avoids the difficulties of any variations in the respective voltages applied to the transducer and potentiometer. Moreover, because of the parallel switching arrangement including the switch arms 26 and 27, any thermal E.M.F.'s, switching noises, and the like are the same for both positions of the switches and will therefore be cancelled so that the A.-C. component operating the servo-amplifier and motor is only determined by the actual difference between the unknown signal from the transducer and the known signal provided by the potentiometer bridge 16.

The condensers $C_1$ and $C_2$ which are connected across the first pair of leads 12a and 13a from the transducer and the second leads 12b and 15b from the potentiometer bridge, respectively, serve as filters to increase further the signal to noise ratio of the device. The condenser $C_3$ further filters the signal applied to the transformer.

In the embodiment of FIGURE 2, the power supply 25 is of low impedance and is therefore connected in parallel with the transducer and potentiometer bridges to provide the substantially identical voltages. In the case of a high impedance power supply, it is preferable to connect the same in series with the bridges to provide substantially identical currents passing therethrough.

Figure 3:
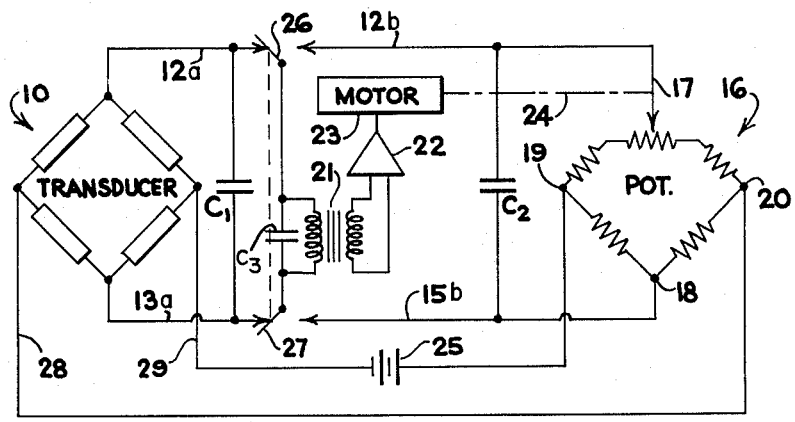

Thus, referring to the second embodiment of the invention as shown in FIGURE 3, the power supply 25 is connected in series with the power leads 28 and 29 passing from the transducer to the junction points 19 and 20 of the potentiometer bridge. The remaining portion of the circuit of FIGURE 3 is identical to FIGURE 2, and corresponding components are identified by the same numerals. The circuit of FIGURE 3 has all of the advantages of the circuit of FIGURE 2 along with the fact that the bridges are energized by identical currents.

While mechanical type switches are schematically illustrated in FIGURES 2 and 3, it should be understood that solid state switches could be used.

From the foregoing description, it will be evident that the present invention has provided a greatly improved potentiometer circuit. Not only are errors eliminated as a consequence of variations in separate power supplies, but in addition, thermal E.M.F.'s common to both systems along with noises generated in the switches are cancelled.

While only two particular embodiments of the improved potentiometer circuit of this invention have been set forth and described in detail, various changes that fall clearly within the scope and spirit of the invention will occur to those skilled in the art. The potentiometer circuit is therefore not to be thought of as limited to the exact embodiments set forth.

What is claimed is:

1. An improved potentiometer circuit for indicating the value of an output signal from a transducer by nulling the same in a potentiometer bridge, including: a variable resistance in said potentiometer bridge; a servo-amplifier and motor system connected to operate said variable resistance in response to an error signal constituting a function of the difference between said output signal and a known signal generated in said bridge to effect nulling of said error signal; a single D.-C. source for energizing said transducer and bridge so that said transducer and bridge are energized by an identical quantity whereby spurious signals as a consequence of variations in the power respectively supplied to said transducer and bridge are eliminated; two pairs of signal conductors connected to the outputs of said transducer and potentiometer bridge and carrying said output signal and known signal respectively; and dual switch means for effecting alternate connections in parallel from said two pairs of signal conductors respectively, to said servo-amplifier and motor system at a given frequency to chop said error signal and provide an A.-C. component for operating said servo amplifier and motor system.

2. In a potentiometer circuit in which an unknown signal from a transducer is balanced against a known signal in a potentiometer bridge having a variable resistance tap adjusted by a servo-amplifier and motor system responsive to an error signal constituting a function of the difference between said unknown signal and said known signal to move said tap in a direction to null said error signal, the improvement comprising: a single D.-C. source adapted to energize said transducer and potentiometer bridge so that said transducer and potentiometer bridge are energized equally; two pairs of signal conductors connected to the outputs of said transducer and bridge and carrying said unknown signal and known signal respectively; and dual switch means for alternately connecting in parallel said two pairs of signal conductors respectively to said servo amplifier at a given frequency to chop said error signal and provide an A.-C. component for operating said servo-amplifier and motor system.

3. An improved potentiometer circuit according to claim 2, in which said D.-C. source has a low impedance and said transducer and potentiometer bridge are connected to said source in parallel so that said transducer and potentiometer bridge are energized by identical voltages.

4. An improved potentiometer circuit according to claim 3, including first and second condensers connected across the two signal conductors in each of said pairs, respectively.

5. An improved potentiometer circuit according to claim 2, in which said D.-C. source has a high impedance and said transducer and potentiometer bridge are connected to said source in series so that said transducer and potentiometer bridge are energized by identical currents.

References Cited by the Examiner

UNITED STATES PATENTS

| | | | |
|---|---|---|---|
| 2,417,015 | 3/1947 | Razek | 340—187 |
| 2,750,547 | 6/1956 | Wannamaker. | |
| 2,766,981 | 10/1956 | Lauler | 324—99 |
| 2,767,974 | 10/1956 | Ballard | 177—211 |
| 2,846,645 | 8/1958 | Ruge | 177—211 |
| 2,889,517 | 6/1959 | Ehret | 324—99 |
| 2,949,769 | 8/1960 | Heller | 324—99 X |

WALTER L. CARLSON, *Primary Examiner.*

R. V. ROLINEC, J. MULROONEY, *Assistant Examiners.*